United States Patent

[11] 3,609,483

| [72] | Inventor | James P. Smyly<br>Laurens, Tenn. |
|---|---|---|
| [21] | Appl. No. | 838,308 |
| [22] | Filed | July 1, 1969 |
| [45] | Patented | Sept. 28, 1971 |
| [73] | Assignee | American Lava Corporation<br>Chattanooga, Tenn. |

[54] THICK FILM TITANATE CAPACITOR COMPOSITION
4 Claims, No Drawings

[52] U.S. Cl. .................................. 317/258,
106/39 R, 106/46, 252/520, 264/61
[51] Int. Cl. ...................................... H01g 1/01,
C04b 33/00
[50] Field of Search ........................... 106/39, 46,
49; 252/63.5, 507, 520; 264/61; 317/258

[56] References Cited
UNITED STATES PATENTS

| 2,980,546 | 4/1961 | Plessner et al. ............... | 106/39 |
|---|---|---|---|
| 3,000,745 | 9/1961 | Cianchi ....................... | 106/39 |
| 3,002,841 | 10/1961 | Goodman ..................... | 106/39 |
| 3,279,947 | 10/1966 | Kaiser ......................... | 106/39 X |
| 3,345,189 | 10/1967 | Fujiwara et al. ............. | 106/39 |
| 3,359,133 | 12/1967 | Smyly ......................... | 106/39 X |
| 3,495,996 | 2/1970 | Delaney et al. ............... | 106/39 |

*Primary Examiner*—Tobias E. Levow
*Assistant Examiner*—W. R. Satterfield
*Attorney*—Kinney, Alexander, Sell, Steldt & Delahunt ABSTRACT: An improved dielectric composition for thick film capacitors and paste for making the same are provided. The composition is a mixture of a high dielectric constant material, a glass frit and modifying oxides and/or compounds blended and milled together and dispersed in a suitable vehicle. The resulting paste can be spread to give a thick film capacitor dielectric which has a dielectric constant up to 1,000. The capacitance per square inch may be in excess of 50,000 pf. per inch$^2$ (7,500 picofarads per square centimeter). The composition adheres well to electrodes of usually desirable metals such as gold, silver, palladium and other noble metals and has maturing temperatures consistent with the use of such metals.

THICK FILM TITANATE CAPACITOR COMPOSITION

This invention relates to dielectric materials and particularly to compositions which can be deposited as films and fired to give ceramic materials having high dielectric constants. More particularly it relates to ceramics comprising dielectric materials of perovskite-type structure bonded by certain glassy compositions which also provide bonding to electrodes.

Electronic circuitry in many applications requires a size reduction of both active and passive components. Normally, a small substrate ½ inch × 1 inch × 0.030 inch will carry the microelectronic circuitry, metal network and its components. The space or real volume required for the various components is often as important as the component's function. Discrete passive components, such as capacitors and resistors, are used if they are small or if there is no other alternative. The preferred discrete capacitors have high capacitance per unit volume such as may be attained in multilayer and chip capacitors. Capacitors of these types are limited in capacitance by two factors, their dimensions and the dielectric constant of the dielectric material in them. As is well recognized in the art, high dielectric constant materials permit attainment of a given capacitance in less space than low dielectric constant materials. In some cases, this is achieved by making a thick film capacitor using a high dielectric constant material which is screened on the substrate in the desired pattern. The term "thick film" is essentially relative and refers to films or coating layers from about 0.0025 or preferably 0.001 to 0.10 mm. (0.1 to 4.0 mils.) in thickness. With respect to capacitors, thin films are normally considered to be less than 0.0025 mm. (0.1 mils) in thickness. Obviously, insulative value must be adequate to prevent breakdown of the dielectric layer under the applied voltage.

Barium titanate is widely used as a high dielectric ceramic. It and lead titanate have the same perovskite structure. The structural feature shared by barium and lead titanate, as contrasted to other perovskites, seems to be that the two large ions, barium and lead, tend to increase the size of the face centered cubic lattice so that the titanium atom is at the lower edge of stability. Although $BaTiO_3$ offers the possibility of attaining high capacitance with very small sized capacitors there are many associated problems with it as a capacitor material. Its properties such as variation of dielectric constant with temperature, and also other properties, such as the dielectric constant, can be modified by forming solid solutions over a wide composition range. Substitutions in the perovskite lattice of $Pb^{+2}$, $Sr^{+2}$, $Ca^{+2}$ and $Cd^{+2}$ can be made for part of the $Ba^{+2}$ ions and still maintain the ferroelectric properties. Substitutions for $Ti^{+4}$ ions can be made by addition of $Sn^{+4}$, $Ce^{+4}$ and $Th^{+4}$. Moreover, the niobates and tantalates are ferroelectrics which can form solid solutions with barium titanate. A vast number of ceramic dielectrics are known which are not necessarily useful for screening or printing of dielectric layers either because of cracking, too great softness or for other reasons. A recently issued patent, U.S. Pat. No. 3,410,705, describes ceramic dielectrics which are in some respects similar to those herein-described but do not appear to be suggested for screening pastes.

It is an object of this invention to provide a dielectric composition spreadable to a thick film about 0.01 to 0.8 mm. (0.4 to 3 mils) thick which bonds to the electrodes of a substance when fired at 1,000° C. or less and after firing yields a ceramic having a dielectric constant of 400 to 1,000 and voltage breakdown per mil of thickness of 100 to 600 volts.

Another object is to provide a capacitor material having a maximum of dielectric constant at or near a temperature of 15–25° C. Other objects will be apparent from the disclosure hereinafter.

It has been found that a particularly useful paste for producing ceramic thick film capacitors comprises solids of from 90–99 percent by weight of high dielectric constant powder, i.e., fine-grained ferroelectric presintered material which has a dielectric constant in excess of 10,000 from 0.3 to 6 percent of a cadmium and antimony containing lead borosilicate glass, and from 0.3 to 9 percent of one or more complementary oxides or modifiers all of less than 200-mesh size and as hereinafter described. The combination of these materials in ratios as herein described provides a thick film capacitor material that yields capacitances of over 50,000 picofarads per square inch (7,500 picofarads per square centimeter) and to which adherent electrodes can be applied readily by conventional silk screen processes using commercially available metallizing pastes. A preferred range for the solids in the paste is 92 to 97 percent by weight high dielectric constant powder and 1–4 percent each of glass frit and complementary oxides. The proportion of high dielectric material is relatively high and of glass frit rather low so that is surprising that the fired dielectrics are relatively impermeable and are quite dense.

It is preferred that the complementary oxides be milled with the high dielectric constant powder before the glass frit is incorporated. The organic vehicle is in a proportion of one-fourth to one-third of the total amount of inorganic solids. The vehicle is milled with the inorganic solids after they have been thoroughly mixed.

The vehicle of the paste may be any conventional combination inasmuch as its purpose is accomplished when the dielectric layer has been formed. It should have sufficient viscosity to provide a screenable consistency to the paste. The vehicle is entirely absent from the final capacitors as a result of being destroyed and/or volatilized during firing operations.

The high dielectric constant powders which make up the bulk of the solid material in the novel pastes of this invention are selected from those described and claimed in U.S. Pat. No. 3,359,133. The compositions, within the ranges set forth in table I, are fired at 1,400° C. for 1 hour in an air atmosphere. The ratio of barium stannate to zirconate should not exceed 1.4 to 1.

Table I

| Component | Range in mol percent |
| --- | --- |
| Barium Titanate | 71 to 77 |
| Strontium Titanate | 8 to 13 |
| Barium Stannate | 6 to 10 |
| Barium Zirconate | 5 to 9 |
| Cerium Oxide or Lanthanum Oxide | 0.01 to 0.7 |

It is not necessary that these specific compounds be used but only that raw materials be proportioned to give the desired overall composition. Thus the desired formulation is established and suitable proportions of available raw materials are then combined. The raw materials after formulation are dry milled and then calcined at a temperature within at least 90 percent of the maturing temperature for a normal ceramic part. The calcined material is crushed and/or pulverized to pass 20-mesh or smaller screen and then ball milled until the average particle size is 1 micron or less. This usually requires at least 50,000 revolutions of the mill with a ball charge of at least 4 times the material charge when the total volume of the mill charge is no greater than 60 percent of the capacity of the ball mill.

The glass frit is used to bond the dielectric materials to the electrodes of the substrate and to bond the dielectric powder. The overall effect is to lower the maturing temperature of the ceramic dielectric to 1,000° C. or lower so that somewhat greater latitude in choice of electrode materials is possible. The frit compositions which are used must mature or melt below the melting point of the dielectric powder and also below the melting point of any metal applied to the substrate previously. Suitable frits are combinations of lead borosilicate and lead cadmium frits and preferably certain combinations of these with other glass formers and modifiers. These compositions fall within the ranges listed below in table II. Lead cadmium borosilicate glasses are used which have thermal expansion characteristics compatible with metal electrodes and with the ceramic substrate. In these $Sb_2O_3$ is especially useful as a flux and CdO is useful both as a flux and for bonding the frit to the dielectric material. Cadmium oxide also tends to form ferroelectrics with certain oxides which may be present. Zinc oxide is not necessary but may be employed in partial replacement of $SiO_2$ to reduce volatilization of PbO and to lower the electrical loss characteristics. It also lowers the maturing temperature.

Table II

| Oxide | Oxide Range in Weight Percent |
| --- | --- |
| PbO | 37 to 55 |
| CdO | 20 to 30 |
| $B_2O_3$ | 10 to 17 |
| $SiO_2$ | 10 to 17 |
| $Sb_2O_3$ | 1 to 2 |
| $MgF_2$ | 1 to 3 |
| ZnO | 0 to 22 |

It is found that certain materials, herein termed complementary oxides or complementary compounds, are advantageously added to the inorganic mix to achieve desirable modifications of the specific chemical and/or electrical functions and/or properties of the fired dielectric.

There are three categories of complementary oxides or compounds which are necessary or optional in a total amount of 0.3- to 9-weight percent in producing compositions of the invention. The total is made up from the following:
  A. Lead oxide compounds which consist of one or more of the compounds lead titanate, lead niobate or lead zirconate in amounts up to 6 percent by weight;
  B. Bismuth oxide compounds consisting of the oxide, the titanate or the niobate in amounts of 0.3 to 4 percent by weight;
  C. Niobium and/or tantalum pentoxide in amounts of less than 2.0 weight percent.

Specifically, the lead oxide compounds assist in lowering the maturing temperature of the dielectric and thus improve the temperature characteristics of the dielectric powder for many firing conditions while also improving the overall characteristics of the glassy phase. It is preferred to add these compounds as such rather than as the separate component oxides for more efficient effect on maturing temperature. These compounds in the small amount used (up to 6 percent and preferably only up to 5 percent) form solid solutions with barium and strontium titanate of the dielectric and also affect the electrical properties but to a lesser extent than would many other depressants of the maturing temperature.

Bismuth oxide and compounds of bismuth also lower the maturing temperature of the dielectric and improve the bonding characteristics of the glass to electrode metals and dielectric. Amounts of bismuth oxide compounds above about 4 percent are found to raise the power factor to an undesirable and objectionable extent.

The niobium and/or tantalum oxides, which may be used individually or together in amounts totaling not over 2 percent are quite refractory and so cannot be used in very large amounts, e.g., over about 2 percent but are used optionally and are then very effective in reducing electrical loss characteristics of the fired capacitor and/or in reducing the power factor of the ceramic. These are both included in amounts which will either form solid solutions with the dielectric materials or will be dissolved in the vitreous glassy phase. Preferably, none of the complementary oxides or compounds is present as a separate undissolved or precipitated phase.

A representative group of dielectric pastes are prepared in which some variation in compositions is made and which pastes are converted to ceramics and compared to ceramics lacking the necessary complementary oxides.

The basic dielectric composition is prepared within the ranges shown in table I from barium and strontium titanate, barium carbonate, stannic oxide, zirconium oxide and cerium oxide. Lanthanum oxide can be substituted for ceric oxide. Proportions are such as to give, after firing at 1,400° C. for 1 hour to effect complete reaction, a composition as shown in table III.

Table III

| Compound | Weight Percent |
| --- | --- |
| Barium Titanate | 74.4 |
| Strontium Titanate | 11.5 |
| Barium Stannate | 7.8 |
| Barium Zirconate | 6.2 |
| Cerium Oxide | 0.1 |
| Total | 100.0 |

These are dry milled, calcined and reground as described above to give a dielectric powder.

Two different frits are provided which embody the preferred components of the invention. Both frits are cadmium and antimony-containing lead borosilicate glasses of which one includes a substantial proportion of zinc. The conventionally used raw materials are melted together in each case. The melts are quenched and pulverized dry. The respective compositions are shown in percent by weight in table IV.

TABLE IV

| | PbO | $B_2O_3$ | $SiO_2$ | CdO | ZnO | $Sb_2O_3$ | $MgF_2$ |
| --- | --- | --- | --- | --- | --- | --- | --- |
| Frit A | 44 | 12 | 11 | 30 |  | 1 | 2 |
| Frit B | 37 | 10 | 10 | 25 | 16 | 1 | 1 |

A series of paste compositions are made using the above dielectric powder and each of the frits together and with various of the desired complementary oxides so that a number of compositions are obtained and converted to test samples by firing at 950° C. for 5 minutes. Each fired composition is then tested for dielectric constant at 25° C. and 1,000 cycles and the percentage change of capacitance from the capacitance at 25° C. is determined over the range of −30° C. to +85° C. In the following table V the amount of dielectric powder of the above composition employed is sufficient to total 100 and the amount of the frit is 3 percent in each instance, i.e., 92 and 3 percent respectively for Run 8.

TABLE V

| | Frit A | | | | Frit B | | | |
| --- | --- | --- | --- | --- | --- | --- | --- | --- |
| Run | 1 | 2 | 3 | 4 | 5 | 6 | 7 | 8 |
| $Bi_2O_3$ (percent) |  | 4 | 4 | 4 |  | 4 | 4 | 4 |
| $PbTiO_3$ (percent) |  |  | 1 |  |  |  | 1 |  |
| $Nb_2O_5$ (percent) |  |  |  | 1 |  |  |  | 1 |
| Dielectric constant | 500 | 598 | 592 | 600 | 550 | 625 | 570 | 630 |
| Percent change±from 25° over range −30° to 85° C | 33 | 22 | 18 | 10 | 18 | 15 | 10 | 8 |

From table V it will be evident that bismuth oxide has a pronounced effect on the dielectric constant and is very desirable particularly in combination with $Nb_2O_5$. Amounts of $Bi_2O_3$ as low as 0.3 percent are useful in these compositions. Bismuth stannate titanate or niobate also provide these desirable results and are used in similar amounts.

The paste compositions include about 65–77 percent by weight of the inorganic materials in an organic binder which is a solution of a relatively high molecular weight material in a relatively low-volatility solvent. For example the binder may include 2–6 percent of a modified cellulose material, gums or natural resins in cylic paraffin, diethylene glycol, pine oil or other suitable solvent. A 4 percent solution of ethyl cellulose in 96 percent of terpineol is used in proportions of 27 parts to 73 parts of the inorganic composition as set forth above. The mixture is ball milled and dispersed to give a paste. Such a paste may be modified in its properties by milling in corrective amounts of any constituents.

A paste prepared as described above is used in making capacitors by one of the following procedures.

A substrate, for example, 96 percent or higher alumina is coated in selected areas with platinum-gold or palladium-silver metal paste of commercially available types. The firing cycle for the first is at 760° C. for 15 minutes or 820° C. peak temperature during 5 minutes. The latter requires 850° C. peak temperature during 5 minutes. Alternatively, firing of the latter can be deferred until a dielectric layer has been applied.

The dielectric paste of the invention, for example, the pastes used in Runs 1 through 8 of table V above, is applied by screen printing preferably using 200-mesh stainless screen. If desired 325-mesh stainless or nylon screen can also be used and other variations are permissible. Advantageously two layers are applied to give a thickness of about 1.5 to 2.5 mils (about 0.03 to 0.07 mm.). The first layer is dried at about 110–115 C. for 30 minutes, the second layer is then applied and dried for the same time. Higher temperatures of firing the dielectric paste from about 800° C. or 850° C. up to 1,000° C. give somewhat higher dielectric constants. In all cases all organic matter is volatilized in the 5 minute firing periods employed. When properly fired the dielectric layer is hard and relatively impervious but not glassy in appearance. Films less than 1 mil (about 0.025 mm.) tend to electrical short circuiting or penetration whereas films over about 3.0 mils (0.075 mm.) tend to crack. Peak temperatures of 850° C. are sufficient for firing when palladium-silver or silver electrodes are used, higher temperatures up to 950° C. or 1,000° C. are used particularly when the ceramic layer is cofired with the electrode on which it rests or when gold-platinum electrodes are used.

The top electrode may be any of the same metals as noted above which is fired at the same temperature or slightly below that used for the base electrode or dielectric layer. It is applied on the dielectric layer by screening and dried for 24 hours before firing. Capacitors having impervious dielectric layers with dielectric constants of 500 and upward to about 1,000 at about 15–25° C. are thus obtained. The dielectrics generally have good stability with respect to temperature changes.

What is claimed is:

1. A paste having spreadable consistency and consisting essentially of from 60 to 80 percent by weight of inorganic components firable to dielectric ceramic in 40 to 20 percent by weight organic vehicle and dissolved binder wherein the inorganic components are of particle sizes to pass a 200-mesh screen and consist essentially of A. from 1 to 4 percent by weight of cadmium antimony containing lead borosilicate glass having a composition within the weight percentage range:

| PbO | 37–55 |
| CdO | 20–30 |
| $B_2O_3$ | 10–17 |
| $SiO_2$ | 10–17 |
| $Sb_2O_3$ | 1–2 |
| $MgF_2$ | 1–3 |
| ZnO | 0–22 |

B. calcined dielectric powder of a particle size of less than 1 micron in an amount of 90 to 99 percent by weight having dielectric constant above 10,000 at 1 kc. and 25° C. and a total composition in mol percent essentially within the range:

| $BaTiO_3$ | 71–77 |
| $SrTiO_3$ | 8–13 |
| $BaSnO_3$ | 6–10 |
| $BaZrO_3$ | 5–9 |
| $CeO_2$ or $La_2O_3$ | 0.01–0.7 |

C. 1 to 4 percent by weight based on the total of inorganic components of complementary oxides and compounds consisting of
   a. from 0.3 to 4.0 percent by weight of a compound of bismuth of the group of oxide, titanate or niobate;
   b. from 0 to 6 percent of a compound of lead of the group zirconate, niobate or titanate; and
   c. optionally up to 2.0 percent by weight total of niobium and/or tantalum pentoxide; not more than 2 percent by weight in said total of inorganic components being $Nb_2O_5$ and/or $Ta_2O_5$.

2. A paste of claim 1 wherein the organic vehicle is terpineol and the dissolved binder is ethyl cellulose.

3. In a capacitor a relatively impervious dielectric body, said body bonded to electrodes having dielectric constant of from about 500 to about 650 and having a temperature characteristic of less than 33 percent over the temperature range of −30° C. to +85° C. and having an inorganic composition consisting essentially of the matured reaction product from A. from 1 to 4 percent by weight of cadmium and antimony containing lead borosilicate glass having a composition within the weight percentage range:

| PbO | 37–55 |
| CdO | 20–30 |
| $B_2O_3$ | 10–17 |
| $SiO_2$ | 10–17 |
| $Sb_2O_3$ | 1–2 |
| $MgF_2$ | 1–3 |
| ZnO | 0–22 |

B. calcined dielectric powder of a particle size of less than 1 micron in an amount of 90 to 99 percent by weight having dielectric constant above 10,000 at 1 kc. and 25° C. and a total composition in mol percent essentially within the range:

| $BaTiO_3$ | 71–77 |
| $SrTiO_3$ | 8–13 |
| $BaSnO_3$ | 6–10 |
| $BaZrO_3$ | 5–9 |
| $CeO_2$ or $La_2O_3$ | 0.01–0.7 |

C. 1 to 4 percent by weight based on the total of inorganic components of dissolved complementary oxides and compounds consisting of
   a. from 0.3 to 4.0 percent by weight of a compound of bismuth of the group of oxide, titanate or niobate;
   b. from 0 to 6 percent of a compound of lead of the group zirconate, niobate or titanate; and
   c. optionally up to 2.0 percent by weight total of niobium and/or tantalum pentoxide; not more than 2 percent by weight of said total of inorganic components being $Nb_2O_5$ and/or $Ta_2O_5$.

4. A paste according to claim 1 consisting essentially of from two-thirds to three-fourths of inorganic solids consisting of 1 to 4 percent each of lead borosilicate glass and complementary oxides and 92 to 97 high dielectric constant powder and from one-third to one-fourth organic vehicle.